United States Patent
Schade et al.

(10) Patent No.: US 11,442,234 B2
(45) Date of Patent: Sep. 13, 2022

(54) DEVICE AND METHOD FOR TRANSFERRING LIGHT BETWEEN AT LEAST ONE OPTOELECTRONIC COMPONENT AND AT LEAST ONE OPTICAL WAVEGUIDE

(71) Applicant: Fraunhofer-Gesellschaft zur Förderung der angewandten Forschung e.V., Munich (DE)

(72) Inventors: Wolfgang Schade, Goslar (DE); Martin Angelmahr, Goslar (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/042,705

(22) PCT Filed: Mar. 29, 2018

(86) PCT No.: PCT/EP2018/058213
§ 371 (c)(1),
(2) Date: Sep. 28, 2020

(87) PCT Pub. No.: WO2019/185156
PCT Pub. Date: Oct. 3, 2019

(65) Prior Publication Data
US 2021/0141173 A1    May 13, 2021

(51) Int. Cl.
*G02B 6/42* (2006.01)
*G02B 6/02* (2006.01)
*G02B 6/293* (2006.01)

(52) U.S. Cl.
CPC ......... *G02B 6/4215* (2013.01); *G02B 6/0229* (2013.01); *G02B 6/02085* (2013.01); *G02B 6/29317* (2013.01); *G02B 6/29323* (2013.01)

(58) Field of Classification Search
None
See application file for complete search history.

(56) References Cited

U.S. PATENT DOCUMENTS

| 5,633,748 A | 5/1997 | Perez et al. |
| 6,002,822 A | 12/1999 | Strasser et al. |
(Continued)

FOREIGN PATENT DOCUMENTS

| WO | WO 99/04309 | 1/1999 |
| WO | WO 00/79319 A1 | 12/2000 |
(Continued)

OTHER PUBLICATIONS

International Search Report with English translation, issued in International Application No. PCT/EP2018/058213, dated Nov. 22, 2020, pp. 1-6, European Patent Office, Rijswijk, Netherlands.
(Continued)

*Primary Examiner* — Omar R Rojas
(74) *Attorney, Agent, or Firm* — Crowell & Moring LLP

(57) ABSTRACT

A device may be provided comprising at least one optoelectronic component and at least one optical waveguide, which are configured to transfer light between the optoelectronic component and the optical waveguide, wherein the optical waveguide contains at least one first longitudinal portion in which at least one Bragg grating is introduced, which has a grating constant which is variable along the longitudinal extent of said Bragg grating, and the optoelectronic component is arranged at a lateral distance from the optical waveguide. Alternatively or in addition, a method may be provided for transferring light between at least one optoelectronic component and at least one optical waveguide.

18 Claims, 2 Drawing Sheets

(56) References Cited

U.S. PATENT DOCUMENTS

| | | |
|---|---|---|
| 6,211,957 B1 | 4/2001 | Erdogan et al. |
| 7,660,497 B2 | 2/2010 | Happel et al. |
| 9,541,694 B2 * | 1/2017 | Tissot ................ G02B 6/0028 |
| 10,175,406 B2 * | 1/2019 | Tissot ................ G02B 6/0076 |
| 2005/0185885 A1 | 8/2005 | Onaka et al. |

FOREIGN PATENT DOCUMENTS

| | | |
|---|---|---|
| WO | WO 01/94896 A1 | 12/2001 |
| WO | WO 2005/050879 A1 | 6/2005 |
| WO | 10 2008 030 187 A1 | 1/2010 |
| WO | WO 2017/081316 A1 | 5/2017 |

OTHER PUBLICATIONS

Pham Van Hoi et al., "Spectra profile expansion of Bragg wavelength on nano-particle embedded fiber-Bragg-grating," Science and Actuators A, dated Oct. 22, 2017, pp. 1-5, vol. 141, Issue 2, published online by Elsevier Science Direct at URL https://doi.org/10.1016/j.sna.2007.10.034.

* cited by examiner

DEVICE AND METHOD FOR TRANSFERRING LIGHT BETWEEN AT LEAST ONE OPTOELECTRONIC COMPONENT AND AT LEAST ONE OPTICAL WAVEGUIDE

CROSS-REFERENCE TO RELATED APPLICATIONS

This application is a 371 nationalization of international patent application PCT/EP2018/058213 filed Mar. 29, 2018. The entire contents of the above-identified application is hereby incorporated by reference.

FIELD OF THE DISCLOSURE

The invention relates to a method for transferring light between at least one optoelectronic component and at least one optical waveguide. The invention also relates to a device having at least one optoelectronic component and at least one optical waveguide, which are configured to transfer light between the optoelectronic component and the optical waveguide. Devices and methods of this kind can be used, for example, to transfer optical data signals into an optical waveguide or to receive them from the optical waveguide. Furthermore, the above mentioned devices and methods can be used to poll fiber-optic sensors.

BACKGROUND

Optical waveguides are known to have a core and a cladding concentrically surrounding the core. Core and cladding have different refractive indices, so that optical signals which are supplied to the core propagate in the core by total reflection. In order to feed the optical signals to the core, a light source, for example a light-emitting diode or a semiconductor laser, is arranged relative to the optical waveguide in such a way that the beam from the light source can enter the core via one end face of the optical waveguide. An optical receiver, e.g. a photodiode, is also arranged at the opposite end of the optical waveguide in extension of the longitudinal extent so that the light leaving the optical waveguide via an end face is guided to the optical receiver.

This known device has the disadvantage that a single receiver or a single light source only can be arranged in extension of the optical waveguide opposite the end face thereof. If different waveguides or receivers have to be used, e.g. for data transfer using wavelength division multiplex, complex spectrometers have to be arranged between the transmitters or receivers and the optical waveguide. The increased complexity of equipment reduces the reliability of operation and at the same time increases the costs.

Therefore, it is an object of the invention to provide a device and a method for data transfer and optical signal readout which reduce the complexity.

SUMMARY OF THE INVENTION

In one embodiment of the invention, the object is solved by a device having at least one optoelectronic component and at least one optical waveguide, said optoelectronic component and said optical waveguide being adapted to transfer light between each other, and wherein the optical waveguide comprises at least one first longitudinal section comprising at least one Bragg grating having a variable grating constant along its longitudinal extent; and the optoelectronic component being arranged at the side of said optical waveguide and at a lateral distance therefrom, wherein said optical waveguide comprises scattering centers at least in said first longitudinal section.

In another embodiment, the object of the invention is solved by a method for transferring light between at least one optoelectronic component and at least one optical waveguide, wherein said optical waveguide comprises at least one first longitudinal section comprising at least one Bragg grating having a variable grating constant along its longitudinal extent, and wherein the optoelectronic component is arranged at the side of said optical waveguide and at a lateral distance thereof, wherein light is scattered at least in the first longitudinal section at least partly into a direction of said optoelectronic component.

BRIEF DESCRIPTION OF THE DRAWINGS

The invention is explained in more detail below with reference to the attached drawings illustrating aspects of the invention without limiting the general concept of the invention. In the drawings.

DETAILED DESCRIPTION

Figure 1:
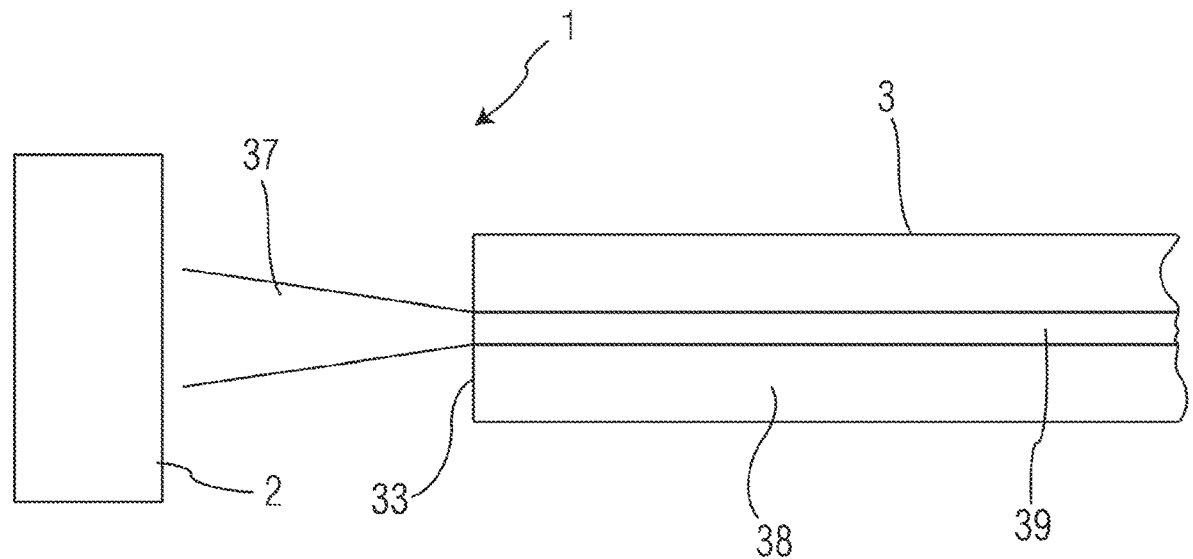
FIG. 1 illustrates the interaction between an optoelectronic component and an known optical waveguide.

The invention relates to a device with at least one optoelectronic component and at least one optical waveguide. The optoelectronic component can, for example, comprise or consist of an LED or a semiconductor laser. In particular, the optoelectronic component can be a light-emitting diode array or a laser diode array. In some embodiments of the invention, the optoelectronic component can be designed to emit light of different wavelengths, either in the form of a plurality of discrete wavelengths or in the form of a comparatively broad spectral distribution. A plurality of discrete wavelengths can be emitted by individual elements of a light-emitting diode array or a laser diode array.

In other embodiments of the invention, the optoelectronic component can be adapted to convert electromagnetic radiation into corresponding electrical signals. For this purpose, the optoelectronic component can consist of or comprise at least one photodiode or at least one photodiode array or a CCD sensor. A CCD sensor can be a line sensor with a plurality of pixels and thus not only detect light intensity but also provide a spatial resolution. In summary, the optoelectronic component is adapted to convert electrical signals into optical signals or optical signals into electrical signals.

The optical waveguide comprises at least one core, which may have a polygonal or round cross-section. The core is surrounded by a concentric cladding which has a lower refractive index than the core. Total reflection therefore occurs at the interface between the core and the cladding, so that optical signals coupled into the core propagate within the core along the longitudinal extent of the optical waveguide.

The optoelectronic component interacts with the optical waveguide in such a way that light from the optical waveguide can be coupled into the optoelectronic component or light from the optoelectronic component can be coupled into the optical waveguide or into the core thereof.

According to the invention, at least one Bragg grating is arranged in a predefined location of the optical waveguide, thereby defining a first longitudinal section. Said Bragg grating is a chirped Bragg grating, i.e. it has a variable grating constant along its longitudinal extent. In some embodiments of the invention, the Bragg grating can be arranged in the core of the optical waveguide. In other embodiments of the invention, the Bragg grating can be arranged in the cladding of the optical waveguide. In still another embodiment of the invention, the Bragg grating can be arranged in both the core and the cladding.

The Bragg grating comprises a plurality of spatial regions or voxels which have a refractive index different from that of the surrounding material. Each of these spatial regions or voxels is located inside the optical waveguide at a given distance to an adjacent spatial regions or voxel in the direction of the longitudinal extent of said waveguide, wherein the distance between adjacent spatial regions indicates the grating constant. According to the invention, this grating constant varies in at least one embodiment along the longitudinal extent of the Bragg grating.

Furthermore, according to the invention the optoelectronic component is arranged at a lateral distance from the optical waveguide. For the purposes of the present description, the term "lateral distance" is defined as a location next to the optical waveguide which lies outside the cone of acceptance of the core originating from an end face of the optical waveguide.

The inventors of the present invention realized that light which is diffracted and scattered at the Bragg grating exits laterally from the optical waveguide and can thus reach the optoelectronic component even if it is located outside the cone of acceptance of the optical waveguide which is located in extension of the core. Due to the variable grating constant of the chirped Bragg grating, light of different wavelengths is diffracted or scattered at different angles, so that light of different wavelengths can reach different optoelectronic components or different partial areas of a single optoelectronic component. Since light paths are basically reversible, the device according to the invention can be used both for coupling a transmitter and for coupling a receiver, i.e. the light can be guided both from the optical waveguide to the optoelectronic component and from the optoelectronic component to the optical waveguide. "Light" within the meaning of the present description here means electromagnetic radiation, for example with a wavelength of about 2 μm to about 200 nm or of about 1.5 μm to about 0.5 μm. The invention is not limited to visible light.

In some embodiments of the invention, scattering centers can be arranged at least in the first longitudinal section. The scattering centers can have the effect that light interfering at the Bragg grating is scattered to a greater extent in the direction of the optoelectronic component compared to an optical waveguide without such scattering centers. As a result, the signal-to-noise ratio may be improved.

In some embodiments of the invention, the density of the scattering centers can be modulated with the grating constant of the Bragg grating so that regions of high density alternate with regions of lower density and the distance between adjacent regions changes within the longitudinal extent of the Bragg grating. Such a change can be synchronous with the grating constant of the Bragg grating.

In some embodiments of the invention, the scattering centers can be formed by local modification of the material of the optical waveguides. Such a local modification can be achieved, for example, by irradiation with a short-pulse laser. In other embodiments of the invention, the material can be modified by exposure with a mask.

In some embodiments of the invention, the scattering centers can be formed by embedded nanoparticles. In some embodiments of the invention, the nanoparticles can comprise or consist of an oxide or a nitride. In some embodiments of the invention, the nanoparticles can comprise or consist of $TiO_2$. During the manufacture of the optical waveguide, such nanoparticles can be introduced into the blank or into the melt from which the optical waveguide is manufactured.

In some embodiments of the invention, the scattering centers can have a diameter of about 10 nm to about 100 nm. In other embodiments of the invention, the scattering centers can have a diameter of about 30 nm to about 90 nm. In still another embodiment of the invention, the scattering centers can have a diameter of about 40 nm to about 80 nm. Scattering centers of this type are usually smaller than the wavelength of the optical signals propagating in the optical waveguide. This prevents diffraction effects at the scattering centers.

In some embodiments of the invention, the scattering centers can have a concentration of about 0.1% to about 5% or of about 0.5% to about 3% or of about 0.8% to about 2.5% of the volume or partial volume provided with the scattering centers. On the one hand, this ensures sufficient intensity in the optoelectronic component and, on the other hand, prevents the signals propagating in the optical waveguide from being scattered to such an extent that the optical losses make further use of the signals impossible.

In some embodiments of the invention, the grating constant along the longitudinal extent of the Bragg grating can be changed in such a way that light of a predeterminable wavelength $\lambda_n$ is scattered at a first location with a first grating constant $A_1$ of the Bragg grating at an angle $\alpha_n$ and is scattered at a second location with a second grating constant $A_2$ of the Bragg grating at an angle $\alpha_n'$, so that the light of the wavelength $\lambda_n$ is imaged in a focused manner in a plane parallel to the optical waveguide at distance d. Such an embodiment of the invention takes into account that from the point of view of a certain partial area of an optoelectronic component different locations of the Bragg grating are reached at different angles. By adapting the diffraction angle to these viewing axes, it is possible to always image light of one wavelength onto the same location or area of the optoelectronic component. Other wavelengths are accordingly imaged on other partial areas of the optoelectronic component, so that the device according to the invention operates as an optical waveguide integrated demultiplexer. Since light paths are basically reversible, the device according to the invention can also be used as a multiplexer which directs light of different wavelengths at different angles onto the Bragg grating, which is then diffracted at the Bragg grating so that it can propagate independently of the wavelength in the core of the optical waveguide.

In some embodiments of the invention, the optical waveguide can further comprise a plurality of fiber Bragg gratings designed to detect mechanical stresses, length changes and/or temperature. For this purpose, fiber Bragg gratings are introduced at predeterminable points of the optical waveguide, for example by point-to-point exposure with a short-pulse laser or by mask exposure. Different fiber Bragg gratings at different locations of the optical waveguide can have a different grating constant, so that different measurement locations can be distinguished by wavelength multiplexing. Under the influence of mechanical stress or a temperature fluctuation, the longitudinal extent of the optical waveguide changes due to strain or compression, which can be detected by changing the grating constant of the fiber Bragg gratings and thus by changing the Bragg wavelength.

Referring now to the drawings, FIG. 1 describes the interaction between an optoelectronic component 2 and a known optical waveguide 3.

The optical waveguide 3 comprises a core 39 and a cladding 38 concentrically surrounding the core. In other embodiments of the invention, several cores 39 can also be present in the cladding 38. In other embodiments of the invention, the cladding 38 can be omitted if the core 39 is surrounded by a medium with a lower refractive index, for example a gas atmosphere.

The optical waveguide 3 can be made of glass or quartz, for example. Differences in refractive index between the cladding 38 and the core 39 can be realized by doping the core, for example. In other embodiments of the invention, the optical waveguide 3 can comprise or consist of a polymer. The optical waveguide 3 thus has an approximately cylindrical outer shape with a comparatively small diameter and comparatively long length.

Light which is coupled into the core 39 is totally reflected at the boundary surface to the cladding 38 and therefore propagates along the longitudinal extent of the optical waveguide 3. For this purpose, the light is coupled in via the end face 33 of the optical waveguide 3. Since the light propagates in the core 39 only if the critical angle of total reflection is not exceeded, an approximately conical acceptance region 37 results outside the optical waveguide 3. Light that radiates outside the acceptance region 37 onto the optical waveguide 3 is not coupled into the core 39 and accordingly does not propagate in the optical waveguide 3.

FIG. 1 also shows an optoelectronic component 2, which can be or comprise a light emitting diode, a superluminescent diode or a semiconductor laser, for example. In this case, the optoelectronic component 2 emits light which falls at least partially into the acceptance region 37 of the optical waveguide 3 and is thus coupled into the core 39.

If the optoelectronic component 2 is a photo receiver, for example a photodiode, a photodiode array or a CCD line, light propagating in the core 39 is transferred from the optical waveguide 3 into the emittance region 37 from where it is at least partially coupled into the optoelectronic component 2. Within these known embodiments, however, it is always absolutely necessary that the optoelectronic component 2 is at least partially in direct line of sight with the acceptance or emittance region 37.

Figure 2:
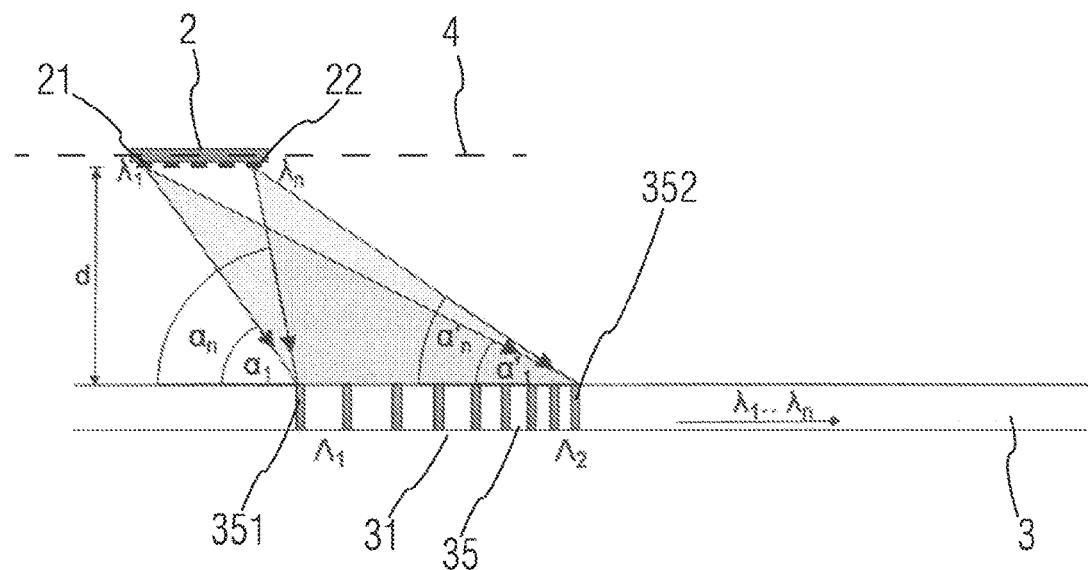
FIG. 2 illustrates the interaction between an optoelectronic component and an optical waveguide according to the invention.

FIG. 2 illustrates the interaction between an optoelectronic component 2 and an optical waveguide 3 according to the present invention. For reasons of simplification, only the core of an optical waveguide 3 is shown in FIG. 2. This does not exclude the presence of a cladding surrounding the core.

Figure 3:
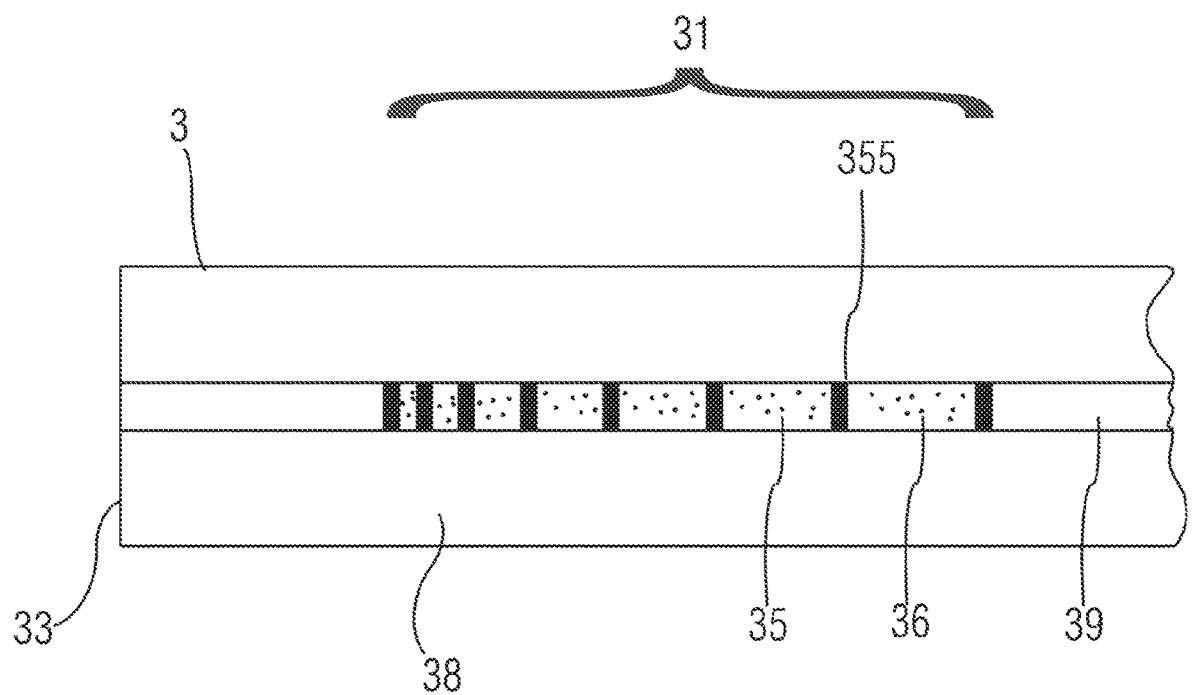
FIG. 3 illustrates a section of an optical waveguide according to the invention.

A Bragg grating 35 is arranged in at least a first longitudinal section 31 of the optical waveguide 3. The structure of the Bragg grating 35 is explained in more detail below by means of FIG. 3. The Bragg grating 35 has a grating constant that is variable along the longitudinal extent thereof, i.e. at a first end 351, the Bragg grating 35 has a first grating constant $A_1$. At a second end 352, the Bragg grating 35 has a second grating constant $A_2$. In the illustrated exemplary embodiment, the grating constant $A_1$ is larger than the grating constant $A_2$. In other embodiments of the invention, the grating constant at the first end 351 can also be smaller than at the second end 352. The grating constant changes along the longitudinal extent of the Bragg grating 35 in a linear, square, cubic or also in another functional context. The change of the grating constant along the longitudinal extent of the Bragg grating 35 is preferably, but not necessarily, continuous and/or monotonous.

The Bragg grating 35 has the effect that light of one wavelength dependent on the grating constant is reflected while light of other wavelengths is transmitted. In addition, scattering occurs in the first longitudinal section 31 so that light of a predeterminable wavelength leaves the waveguide 3 at a defined angle dependent on the respective location within the first longitudinal section 31. Provided that the grating constant along the longitudinal extent of the Bragg grating is selected in such a way that light of a predeterminable wavelength $\lambda_n$ is scattered at a first location 351 with a first grating constant $A_1$ of the Bragg grating 35 at an angle $\alpha_1$ and is scattered at a second location 352 with a second grating constant $A_2$ of the Bragg grating at an angle $\alpha_1'$, this light can be imaged in a focused manner in a plane 4 parallel to the optical waveguide 3 at a distance d. Thus, light of a first wavelength $\lambda_1$ is imaged in a first partial area 21 of the optoelectronic component 2 and light of a second wavelength $\lambda_n$ different therefrom is imaged in a second partial area 22 of the optoelectronic component 2. Optical signals of different wavelengths are thus imaged at different locations of the optoelectronic component 2, so that the device according to the invention can be used as a demultiplexer, for example. For this purpose, the optoelectronic component 2 can, for example, be or comprise a photodiode array or a CCD line.

Since light paths are in principle reversible, the optoelectronic component 2 can also be or comprise an array of laser diodes of different wavelengths or a superluminescent diode which emits light of different wavelengths or also an array of superluminescent diodes. In all these cases, light of different wavelengths is emitted from different partial areas of the optoelectronic component 2 and coupled into the optical waveguide 3 via the first longitudinal section 31 of the optical waveguide 3 with the Bragg grating 35. In this case, the device according to the invention can be used as a multiplexer or as a coupling element.

FIG. 3 explains again the optical waveguide 3 according to the invention by means of an embodiment. As already described above, this waveguide has a core 39 and a cladding 38 surrounding the core. In a first longitudinal section 31 of the core 39 there is at least one Bragg grating 35. The Bragg grating 35 comprises a plurality of spatial regions 355, which have a refractive index different from that of the surrounding material of the core 39. Such spatial regions 355 can be obtained, for example, by point-to-point exposure with a short-pulse laser. For this purpose, it is possible to use laser pulses with a pulse duration between about 20 fs and about 200 fs and pulse energies between 1 μJ and about 100 μJ at a repetition rate between about 10 Hertz and about 500 Hertz. In other embodiments of the invention, which use e.g. polymer waveguides, the spatial regions 355 can also be introduced by lithographic methods, for example by direct-write lithography or by mask lithography. The distance between adjacent spatial regions 355 defines the grating constant of the Bragg grating 35, which changes, as shown, along the longitudinal extent and thus along the first longitudinal section 31.

Furthermore, scattering centers 36 are arranged at least in the first longitudinal section 31 and scatter the light brought to interference at the Bragg grating 35 via the cladding surface of the optical waveguide 3 laterally out of the optical waveguide 3. The optoelectronic component 3 is thus located laterally at a distance from the optical waveguide 3 as shown in FIG. 2 and thus outside the direct acceptance region 25 at the end face 33 of the optical waveguide 3.

The scattering centers 36 can, for example, be produced by material modification with a short-pulse laser or introduced in the form of nanoparticles. The concentration of the nanoparticles or the scattering centers can here be in the range of about 0.1 to 5 vol. %, at least in the first longitudinal section 31. According to the invention, the scattering centers have a diameter between about 10 nm and about 100 nm.

Figure 4:
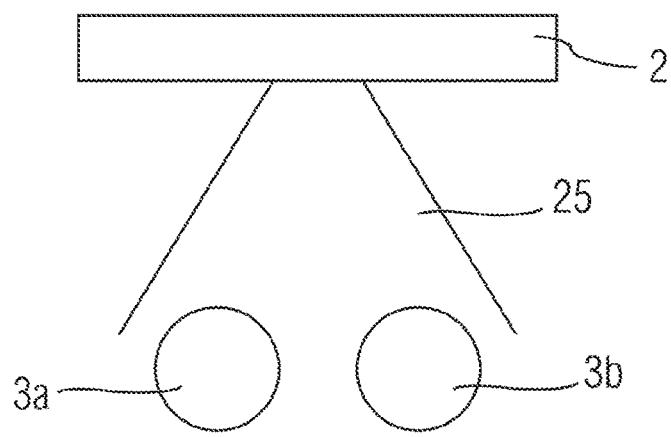
FIG. 4 illustrates the interaction between a single optoelectronic component and a plurality of optical waveguides.

FIG. 4 is used to explain once again the interaction between an optoelectronic component 2 and two waveguides 3a and 3b. Since the optoelectronic component 2 is arranged laterally at a distance from the waveguide 3, it can also illuminate two waveguides 3a and 3b simultaneously or receive light from two waveguides 3a and 3b with a comparatively large acceptance or emittance range 25. Since each waveguide 3a and 3b comprises at least one Bragg grating 35, as described above, the light emitted by a single optoelectronic component 2 can subsequently propagate in both waveguides. In this way, two optical waveguides, each comprising a plurality of fiber-optic sensors, can be easily supplied with an optical interrogation signal by a single optoelectronic component.

The invention shall not be limited to the illustrated embodiments. Therefore, the above description should not be regarded as restrictive but as explanatory. The following claims are to be understood in such a way that a stated feature is present in at least one embodiment of the invention. This does not exclude the presence of further features. If the claims and the above description define "first" and "second" features, this designation is used to distinguish between two similar features without determining a ranking order.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A device comprising at least one optoelectronic component and at least one optical waveguide, said optoelectronic component and said optical waveguide configured to transfer light between each other, and
    wherein the optical waveguide comprises:
        at least one first longitudinal section comprising at least one Bragg grating having a variable grating constant along its longitudinal extent, the at least one Bragg grating configured to permit light having a predetermined wavelength to be transmitted through the at least one Bragg grating; and
        a plurality of scattering centers at least in said first longitudinal section, wherein the optoelectronic component is arranged at the side of said optical waveguide and at a lateral distance therefrom, wherein the scattering centers are configured to scatter the light having the predetermined wavelength laterally out of the at least one optical waveguide.

2. The device according to claim 1, wherein the scattering centers are formed by dispersed nanoparticles.

3. The device according to claim 1, wherein the scattering centers have a diameter of about 10 nm to about 100 nm.

4. The device according to claim 1, wherein the scattering centers have a concentration of about 0.1% to about 5% by volume.

5. The device according to claim 1, wherein said Bragg grating with the variable grating constant along the longitudinal extent is configured to focus light of a wavelength $\lambda_n$ on a plane arranged parallel to the optical waveguide at a given distance d by selecting the grating constant of said Bragg grating such that light of a first wavelength $\lambda_1$ is scattered at a first angle $\alpha_1$ at a first location having a first grating constant $A_1$ of the Bragg grating and light of a second wavelength $\lambda_2$ is scattered at a second angle $\alpha_2$ at a second location having a second grating constant $A_2$ of the Bragg grating.

6. The device according to claim 1, wherein the optoelectronic component comprises a superluminescent diode, a photodiode, a CCD sensor, and/or a laser diode.

7. The device according to claim 1, wherein the grating constant A of the Bragg grating changes along the longitudinal extent with a linear relationship, a square relationship, and/or a cubic relationship.

8. A method for sensing a mechanical stress, a change in length, and/or a temperature change by transferring light between at least one optoelectronic component and at least one optical waveguide,
    wherein said optical waveguide comprises at least one first longitudinal section comprising at least one Bragg grating and a plurality of scattering centers, said Bragg grating having a variable grating constant along its longitudinal extent, said Bragg prating configured to permit light having a predetermined wavelength to be transmitted through the at least one Bragg grating to the scattering centers, wherein the scattering centers are configured to scatter the light having the predetermined wavelength laterally out of said optical waveguide, and
    wherein the optoelectronic component is arranged at the side of said optical waveguide and at a lateral distance thereof, and
    wherein said optical waveguide further comprises at least one second fiber Bragg grating arranged in at least one second longitudinal section of the optical waveguide and said second fiber Bragg grating is subject to a mechanical stress, a change in length, and/or a temperature change, and
    wherein light is at least partially reflected at said second fiber Bragg grating and scattered at least in the first longitudinal section at least partly into said optoelectronic component.

9. The method according to claim 8, wherein light of a wavelength $\lambda_n$ is focused on a plane arranged parallel to the optical waveguide at a given distance d by selecting the grating constant of said Bragg grating such that light of a first wavelength $\lambda_1$ is scattered at a first angle $\alpha_1$ at a first location having a first grating constant $A_1$ of the Bragg grating and light of a second wavelength $\lambda_2$ is scattered at a second angle $\alpha_2$ at a second location having a second grating constant $A_2$ of the Bragg grating.

10. The method according to claim 8, further comprising subjecting at least one second fiber Bragg grating arranged in at least one second longitudinal section of the optical waveguide to a mechanical stress, a change in length, and/or a temperature change.

11. A device comprising at least one optoelectronic component and at least one optical waveguide, said optoelectronic component and said optical waveguide configured to transfer light between each other, and
wherein the optical waveguide comprises:
at least one longitudinal section comprising at least one Bragg grating and a plurality of scattering centers, said Bragg grating having a variable grating constant along its longitudinal extent, the Bragg grating configured to permit light having a predetermined wavelength to be transmitted through the Bragg grating, wherein the scattering centers are configured to scatter the light having the predetermined wavelength laterally out of said optical waveguide,
wherein said scattering centers are formed by local modifications of the material of the optical waveguide, by laser radiation and/or by dispersed nanoparticles, and wherein the optoelectronic component is arranged at the side of said optical waveguide and at a lateral distance therefrom.

12. The device according to claim 11, wherein the scattering centers have a diameter of about 10 nm to about 100 nm.

13. The device according to claim 11, wherein the scattering centers have a concentration of about 0.1% to about 5% by volume.

14. The device according to claim 11, wherein said Bragg grating with the variable grating constant along the longitudinal section is configured to focus light of a wavelength $\lambda_n$ on a plane arranged parallel to the optical waveguide at a given distance d by selecting the grating constant of said Bragg grating such that light of a first wavelength $\lambda_1$ is scattered at a first angle $\alpha_1$ at a first location having a first grating constant $A_1$ of the Bragg grating and light of a second wavelength $\lambda_2$ is scattered at a second angle $\alpha_2$ at a second location having a second grating constant $A_2$ of the Bragg grating.

15. The device according to claim 11, wherein the optoelectronic component comprises a superluminescent diode, a photodiode, a CCD sensor, and/or a laser diode.

16. The device according to claim 11, wherein the grating constant A of the Bragg grating changes along the longitudinal extent with a linear relationship, a square relationship, and/or a cubic relationship.

17. The device according to claim 1, wherein the scattering centers are formed by local modifications of the material of the optical waveguide by laser radiation.

18. The device according to claim 1 further comprising at least one second longitudinal section, wherein at least one second fiber Bragg grating is arranged in the at least one second longitudinal section of the optical waveguide and configured to detect a mechanical stress, a change in length, and/or a temperature change.

* * * * *